US007291683B2

(12) United States Patent
Tebbe et al.

(10) Patent No.: US 7,291,683 B2
(45) Date of Patent: Nov. 6, 2007

(54) COMPATIBLE BLENDS OF THERMOPLASTIC MOLDING COMPOSITIONS

(75) Inventors: Heiko Tebbe, Dormagen (DE); Volker Müller, Philippsburg (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 0 days.

(21) Appl. No.: 10/863,888

(22) Filed: Jun. 8, 2004

(65) Prior Publication Data

US 2005/0049363 A1 Mar. 3, 2005

(30) Foreign Application Priority Data

Jun. 12, 2003 (DE) ................................ 103 26 380

(51) Int. Cl.
*C08F 283/04* (2006.01)

(52) U.S. Cl. .................. 525/424; 428/474.4; 525/166; 525/425

(58) Field of Classification Search ................ 525/166, 525/425, 424; 428/474.4
See application file for complete search history.

(56) References Cited

U.S. PATENT DOCUMENTS 2,853,473 A 9/1958 Campbell et al. .......... 260/77.5
2,853,518 A 9/1958 Balon ......................... 260/551
3,502,722 A 3/1970 Neumann ................... 260/566
3,835,098 A 9/1974 Brown et al. ............. 260/75 N
4,128,599 A 12/1978 Thomas et al. ......... 260/857 R
4,689,372 A * 8/1987 Han et al. ................... 525/390
4,861,828 A * 8/1989 Waggoner .................... 525/66
5,434,305 A 7/1995 Hennig et al. .............. 564/252
5,621,031 A 4/1997 Leimann et al. ............ 524/195
5,733,959 A * 3/1998 Heitz et al. ................. 524/195
5,866,672 A 2/1999 Ohara et al. ................ 528/305
5,981,062 A * 11/1999 Stroud et al. ............... 428/364
6,031,031 A 2/2000 Weber et al. ................. 524/95
6,451,890 B1 9/2002 Imashiro et al. ............ 524/195

FOREIGN PATENT DOCUMENTS

DE 1 285 747 12/1968
GB 940804 11/1963
JP 10-158489 * 6/1998

OTHER PUBLICATIONS

Gummi Fasem Kunststoffe GAK, 5, vol. 54, (month unavailable) 2001, pp. 299-303, E. Haberstroh & S. Prollius, “Reaktives Blenden von unverträglichen Kunststoffen am Beispiel von Polyamid und Polyestern”.

Chemical Reviews, vol. 81, (month unavailable) 1981, pp. 589-636, Andrew Williams and Ibrahim T. Ibrahim, “Carbodiimide Chemistry: Recent Advances”.

* cited by examiner

*Primary Examiner*—Ana Woodward
(74) *Attorney, Agent, or Firm*—Nicanor A. Kohncke

(57) ABSTRACT

The present invention relates to compatible blends of, per se incompatible, thermoplastic molding compositions, to methods for the production thereof, and to the use of the blends according to the present invention to produce films, fibers and molded articles.

12 Claims, No Drawings

COMPATIBLE BLENDS OF THERMOPLASTIC MOLDING COMPOSITIONS

FIELD OF THE INVENTION

The present invention relates to compatible blends of thermoplastic molding compositions, to methods for the production of compatible blends of thermoplastic molding compositions, and to the use of the blends according to the present invention to produce films, fibers and molded articles.

BACKGROUND OF THE INVENTION

Organic carbodiimides and polycarbodiimides are known. Their chemistry and production are described, for example, in Chemical Reviews, vol. 81 (1981), pp. 589 to 639 and Angewandte Chemie 74 (1962), pp. 801 to 806.

Carbodiimides and polycarbodiimides are preferably used as stabilizers against the hydrolytic cleavage of polyester-based plastics materials, as described, for example in EP-A 0 602 477, U.S. Pat. Nos. 2,853,473, 2,853,518 and 3,502,722. According to DE-A 1 494 009, aromatic and/or cycloaliphatic monocarbodiimides, which are substituted in the 2 and 2' position are particularly suitable for use as stabilizers. Polycarbodiimides having a molecular weight of over 500 and a content of more than 3 carbodiimide groups are described in DE-A 1 285 747 as stabilizers against the effects of heat and humidity in ester group-containing plastics materials.

Blends of thermoplastic molding compositions are arousing increasing interest in engineering, as new customized property profiles can be attained by the mixing of known polymers. Only a few of the known thermoplastic molding compositions are, however, miscible with one another. The majority of thermoplastic molding compositions are not miscible without further measures. In most cases, at least partial miscibility is, however, necessary for the optimal attainment of properties.

Various generally known methods can be used to improve miscibility. The mixing of polymers in the molten state only results in a homogeneous blend in compatible polymers. Another method is graft polymerization: the polymerization of monomers onto an existing polymer. This method is limited to a few monomers and can be carried out only with special equipment.

Another method for improving the miscibility of thermoplastic molding compositions is the use of compatibilizers. These react chemically with the two blend components in the production of the blend, and thus result in improved miscibility. A known method is the use of maleic anhydride or, as described in DE-A 19 739 686, the use of bisoxazolines as a compatibilizers. The known compatibilizers can, however, only be used on a few blends of thermoplastic molding compositions. Explosive peroxides must, at the same time, also be used to produce blends using maleic anhydride, which causes production costs to rise.

In the technical journal Gummi Fasern Kunststoffe GAK 5/2001, p. 299, Title: "Reaktives Blenden von unverträglichen Kunststoffen am Beispiel von Polyamid und Polyestern" ["Reactive blending of incompatible plastics materials, using the example of polyamide and polyesters"], the difficulty of reactive extrusion by means of the functionalization (degradation) of the polyamide in one extrusion stage, and the actual reactive blending process by means of transesterification and coupling of the blend in a second extrusion stage, is apparent. There is also a technical difficulty present, i.e. that the required arrangement of two twin-screw extruders is not readily available, and that difficulties occur in exact process control owing to the degradation of the polyamide with the subsequent transesterification of the PET.

The object of the present invention was to provide compatibilizers that are universally and cost-effectively suitable for producing blends of thermoplastic molding compositions, and thus to make possible the preparation of these blends.

SUMMARY OF THE INVENTION

The present invention is directed to the use of carbodiimides and/or polycarbodiimides as a compatibilizer, which allows the preparation of blends of thermoplastic molding compositions which contain, in addition to at least two different, per se incompatible, thermoplastic molding compositions containing at least one of the functional groups —COOH, —OH, —SH, $NH_2$, —NHR, 0.01 to 10% by weight of carbodiimides and/or polycarbodiimides of the formula (I)

$$R'—(—N{=}C{=}N—R—)_n—R'' \quad (I),$$

in which

R represents an aromatic or araliphatic arylene or aralkylene radical which, in at least one ortho-position, preferably in both ortho-positions to the aromatic carbon atom which carries the carbodimide group, carries aliphatic and/or cycloaliphatic substituents with at least 2 C-atoms, preferably branched or cyclic aliphatic radicals with at least 3 C-atoms, R' represents aryl, aralkyl or R—NCO, R—$NHCONHR^1$, R—$NHCONR^1R^2$ and R—$NHCOOR^3$, R" represents —N=C=N-aryl, —N=C=N-aralkyl, —NCO, —$NHCONHR^1$, —$NHCONR^1R^2$ or —$NHCOOR^3$, wherein, in R' and in R", independently of one another, $R^1$ and $R^2$ are the same or different and represent an alkyl, cycloalkyl or aralkyl radical, and $R^3$ has one of the meanings of $R^1$ or represents a polyester or a polyamide radical, and n represents an integer from 2 to 5,000, preferably from 2 to 500.

The present invention also relates to a method for producing the blends of thermoplastic molding compositions according to the present invention, which is characterized in that the, per se incompatible, thermoplastic molding compositions are mixed with one another, in the amount specified above, in the molten state, in a suitable mixing unit, using carbodiimides and/or polycarbodiimides as a compatibilizer.

The present invention also relates to the use of the blends according to the present invention for producing films, fibers and molded articles.

DETAILED DESCRIPTION OF THE INVENTION

The carbodiimides and/or polycarbodiimides (Formula I) used to produce the blends according to the present invention can be produced from monoisocyanates and/or diisocyanates and in the presence of catalysts, through condensation with the elimination of carbon dioxide at elevated temperatures, for example at 40° C. to 200° C. Appropriate methods are described in DE-A-11 30 594. Strong bases or phosphorus compounds, for example, have proven to be effective catalysts. Phospholene oxides, phospholidines or phospholine oxides are preferably used. Any isocyanates are suitable for producing the carbodiimides and/or polycarbodiimides used, wherein carbodiimides and/or polycarbodiimides that are based on aromatic isocyanates substituted by $C_1$ to $C_4$-alkyl, such as, for example, 2,6-diisopropylphenylisocyanate, 2,4,6-triisopropylphenyl-1,3-diisocyanate, 2,4,6-triethylphenyl-1,3-diisocyanate, 2,4,6-trimethylphenyl-1,3-diisocyanate, 2,4'-diisocyanatodiphenyl-methane, 3,3',5,5'-tetraisopropyl-4,4'-diisocyantodiphenyl-methane, 3,3',5,5'-tetraethyl-4,4'-diisocyanatodiphenyl-methane, or the mixtures thereof, and on substituted aralkyls, such as 1,3-bis-(1-methyl-1-isocyanato-ehtyl)-benzol, are preferably used.

Suitable thermoplastic molding compositions for producing the blends according to the present invention are any known thermoplastic molding compositions that contain at least one functional group from the group comprising carboxylic acid, hydroxyl group, amino group or mercaptan group, and are not per se compatible with one another. The functional group can be a terminal group, as, for example, in polyamides or polyesters, be incorporated by polymerization into the polymer chain, such as, for example, polyvinyl alcohol, polyacrylic acid or copolymers of ethylene and acrylic acid, or be grafted onto the polymer chain, such as, for example, polyethylene grafted with maleic anhydride.

The thermoplastic molding compositions according to the present invention are produced by means of the known polymerization methods, for example polyaddition, polycondensation or radical polymerization.

Polyamide-based (for example polyamide 6, polyamide 6.6, polyamide 12, polyamide 4,6 and polyamide 11, polyamide 6.9, polyamide 6.10, polyamide 6.12 and the mixtures thereof) molding compositions and also semi-aromatic polyamides (for example PAMXD), amorphous polyamides (for example 6-3-T, PA 6 I), polyamide imide, PA12-copolymers (for example polyether block amides), or thermoplastic elastomers PA are preferably used. Polyamides of this type are known and described in the literature, for example in Saechtling, Kunststoff Taschenbuch, 27th Edition, 1992, Carl Hanser Verlag, pp. 465 to 479.

Thermoplastic polyesters based on aromatic and/or aliphatic dicarboxylic acids and an aromatic and/or aliphatic dihydroxy compound are preferably used as the second thermoplastic molding composition.

Polyalkylene terephthalates with 2 to 10 C-atoms in the alcohol portion are a first group of preferred polyesters.

Polyalkylene terephthalates of this type are known and described in the literature. They contain in the main chain an aromatic ring, which originates from aromatic dicarboxylic acid. The aromatic ring can also be substituted, for example by halogen, chlorine and bromine, or by $C_1$-$C_4$-alkyl groups and methyl, ethyl, i- or n-propyl and n-, i- or t-butyl groups.

These polyalkylene terephthalates can be produced in a known way by reaction of aromatic dicarboxylic acids, the esters thereof, or other ester-forming derivatives containing aliphatic dihydroxy compounds. Preferred dicarboxylic acids include 2,6-naphthalene dicarboxylic acids, terephthalic acid and isophthalic acid, or the mixtures thereof. Up to 30 mol % of the aromatic dicarboxylic acids can be replaced by aliphatic or cycloaliphatic dicarboxylic acids, such as adipic acid, azelaic acid, sebacic acid, dodecanedioic acids and cyclohexanedicarboxylic acids.

Of the aliphatic dihydroxy compounds, diols with 2 to 6 carbon atoms, such as 1,2-ethane diol, 1,4-butane diol, 1,2-propane diol, 1,3-propane diol, 1-6-hexane diol, 1,4-cyclohexane diol, 1,4-cyclohexane dimethylanol and neopentyl glycol or the mixtures thereof are preferred.

Completely aromatic polyesters, which are derived from aromatic dicarboxylic acids and aromatic dihydroxy compounds, are a further suitable group.

Mixtures of polyalkylene terephthalates and completely aromatic polyesters can, of course, also be used. These mixtures contain in general 20 to 98% by weight of the polyalkylene terephthalate, and 2 to 80% by weight of the completely aromatic polyester.

A further group is formed by polyesters based on aliphatic dicarboxylic acids, such as, for example, adipic acid, azelaic acid, sebacic acid, dodecanedioic acids and cyclohexanedicarboxylic acids, and aliphatic dihydroxy compounds, such as, for example, 1,2-ethane diol, 1,4-butane diol, 1,2-propane diol, 1,3-propane diol, 1-6-hexane diol, 1,4-hexane diol, 1,4-cyclohexane diol, 1,4-cyclohexane dimethylanol and neopentyl glycol.

Polyester block copolymers, such as copolyether ester, can of course also be used. Products of this type are known and described in the literature, for example in U.S. Pat. No. 3,651,014. Corresponding products are also commercially available, for example Hytrel® (DuPont), Arnitel® (DSM) and Pibiflex® (EniChem).

According to the present invention, "polyesters" shall also be taken to mean aromatic polyester carbonates that can be obtained by reaction of aromatic dihydroxy compounds, preferably bisphenol A and bis-(4-hyroxyphenyl)-2,2-propane, phosgene and aromatic dicarboxylic acids, such as isophthalic acid and/or terephthalic acid.

The carbodiimides and/or polycarbodiimides according to the present invention can be mixed together with at least two different thermoplastic molding compositions according to the present invention, to form a blend. For this purpose, 0.01 to 10% by weight, preferably 0.1 to 2% by weight, of the carbodiimides and/or polycarbodiimides are mixed with 99.99 to 90% by weight of the at least two different thermoplastic molding compositions according to the present invention, to form a blend. Two different thermoplastic molding compositions are preferably used. The different thermoplastic molding compositions are used in ratios from 20:1 to 1:20, a ratio of 5:1 to 1:5 preferably being used.

The carbodiimides and/or polycarbodiimides according to the present invention can be mixed with the at least two different thermoplastic molding compositions according to the present invention in mixing units that are typically used in plastics material processing (DIN 24450, Saechtling-Kunststofftaschenbuch). Kneaders, single-screw extruders, twin-screw extruders, cascade extruders, devolatilizing extruders, multi-screw extruders and planetary-gear extruders are particularly suitable as mixing units. The process is conventionally carried out above the melt temperature of at least one of the components.

The blends of thermoplastic molding compositions according to the present invention are preferably produced in wholly closely intermeshing twin-screw extruders, single-screw extruders, which operate according to the stator/rotor principle (for example Staromix® from Reifenhäuser), for high-speed extrusion, triple-screw extruders, multi-screw extruders, which operate according to the planetary extruder principle, in continuous/discontinuous KO-kneaders, for example with slow-speed rotor-stator combination (for example KEX®, Drais, Mannheim), or in continuous dispersion kneaders.

The miscibility of melt-processible polyesters with polyamides and aromatic polycarbodiimides is produced, according to the present invention, in that a polyester thermoplastic having a water content of 0.03% by weight, a polyamide thermoplastic having a water content of 0.07% by weight, an aromatic polycarbodiimide, and optionally additional additives, are introduced separately into the kneading chamber of the twin-screw extruder, are homogeneously dispersed and extruded in the melt, above the melt temperature of the thermoplastic, with an L/D ratio of 28 to 45 and special kneading elements, are removed in strands, cooled in a water bath, granulated and dried. The granular material thus obtained has a water content of 0.03% by weight. The constituents can alternatively be mixed with one another at room temperature, and subsequently extruded in a twin-screw extruder.

The blends according to the present invention can be produced according to various methods. The carbodiimides and/or polycarbodiimides according to the present invention can, for example, be mixed directly with the at least two thermoplastic molding compositions according to the present invention, to form a blend. The carbodiimides and/or polycarbodimides according to the present invention can also be first blended with a thermoplastic molding composition according to the present invention, to form a pre-batch, and the pre-batch then be mixed with the next thermoplastic molding composition according to the present invention. According to another procedure, the two different thermoplastic molding compositions according to the invention can first be pre-compounded, and the carbodiimides and/or polycarbodiimides according to the present invention subsequently mixed into the pre-compound.

In the production of the blends according to the present invention, other known additives, such as, for example, stabilizers, fillers, dyes, flame retardants and lubricants, can be incorporated into the blend according to the present invention.

The blends according to the present invention can be used for producing films, fibers (monofilaments and multifilaments) and molded articles, which are also the subject of the present invention. Molded articles of this type are, for example, machine housings, motor vehicle parts (for example the plastics material parts of hybrid articles, such as motor vehicle radiators/heat exchangers) or other items of common everyday use.

EXAMPLES

Example 1

PET (Polyclear® T86; Hoechst AG) having a carboxyl group content of 20 mVal/kg was melted with a polyamide (Durethan® B40; Bayer AG) at 260° C. to 280° C. in a twin-screw extruder of the ZSK 25 type (Werner & Pfleiderer, Stuttgart), with an L/D ratio of >35, equipped with kneading elements and a cooled first feed zone. The strands thus extruded were cooled in a water bath, granulated and dried.

The granular material obtained exhibited a tendency towards phase separation as soon as the extruder nozzle was rapidly removed. The solidified polymer strand is very brittle and breaks very easily under mechanical bending stress (see Table 1).

Example 2

PET (Polyclear) T86; Hoechst AG) having a carboxyl group content of 20 mVal/kg was melted with a polyamide (Durethan® B40; Bayer AG) and with an aromatic polycarbodiimide (Stabaxol® P100; Rhein Chemie Rheinau GmbH) at 260° C. to 280° C. in a twin-screw extruder of the ZSK 25 type (Werner & Pfleiderer, Stuttgart), with an L/D ratio of >35, equipped with kneading elements and a cooled first feed zone. The strands thus extruded were cooled in a water bath, granulated and dried.

The granular material obtained exhibits clearly improved extrusion properties in comparison to that obtained according to Example 1.

The granular material was melted at 220° C. to 280° C. in an injection molding machine of the 320 S type from Arburg, and was sprayed onto test pieces.

In contrast to the material from Example 1, a test piece from the compound according to Example 2 can be bent extensively and does not subsequently exhibit any stress-whitening. Test pieces made of the compound according to Example 1 exhibit clear brittle fracture or failure under the same testing (see Table 1).

Example 3

Polyethylene (Novex® M21 N430) was melted with an aromatic polycarbodiimide (Stabaxol® P100; Rhein Chemie Rheinau GmbH), 3% by weight relative to polyethylene, at 220° C. to 280° C. in the same twin-screw extruder as in Example 1. The strands thus extruded were cooled in a water bath, granulated and dried.

Example 4

The granular material from Example 3 was mixed as a dry blend with PET (Bripet® 2000 BST; Helm AG) and a polyamide (Durethan® B40; Bayer AG), and then melted at 220° C. to 280° C. in an injection molding machine of the 320 S type by Arburg and sprayed onto test pieces.

The test pieces were then mechanically tested.

The granular material from Example 4 exhibits clearly improved extrusion properties.

In contrast to the material from Example 1, a test piece from the compound according to Example 4 can be bent extensively and does not then exhibit any stress-whitening. A test piece from Example 1 exhibits clear brittle fracture or failure under the same testing (see Table 1).

TABLE 1

| Ex. | Carrier polymer | Proportion of PET [% by weight] | PA 6 [% by weight] | Proportion of carbodiimide [% by weight] | Polycarbodiimide type | Fracture under mechanical bending stress |
|---|---|---|---|---|---|---|
| 1 | PET/PA6 | 50.00 | 50.00 | — | — | yes |
| 2 | PET/PA6/P100 | 50.00 | 48.50 | 1.50 | Stabaxol P100 | no |
| 4 | PET/PA6/Example 3 | 42.50 | 42.50 | 0.45 | Stabaxol P100 | no |

Examples 1, 2 and 4 were aged in an autoclave at 80° C., in a saturated water vapor atmosphere, for 2 days. Tensile tests to DIN 53455 were then carried out on the aged tensile specimens, and the results compared with those of the tensile tests prior to ageing (see Tables 2 and 3).

TABLE 2

| Example | Tear strengths to DIN 53455 after ageing in the autoclave | |
|---|---|---|
| | 0 days | 2 days |
| PET | 63.52 | 3.55 |
| PA 6 | 66.96 | 47.19 |
| 1 | 62.13 | 3.37 |
| 2 | 65.05 | 18.76 |
| 4 | 53.96 | 20.45 |

TABLE 3

| Example | Elongation at break to DIN 53455 after ageing in the autoclave | |
|---|---|---|
| | 0 days | 2 days |
| PET | 6.40 | 0.88 |
| PA 6 | 5.81 | 172.13 |
| 1 | 4.7 | 1.03 |
| 2 | 5.93 | 3.05 |
| 4 | 6.38 | 3.73 |

Tables 2 and 3 show that the Examples 2 and 4 according to the present invention exhibit, in comparison with Example 1, significantly less change in mechanical values (tear strength and elongation at break) after ageing.

Example 5

The F3-tensile test pieces produced from Examples 1 and 2 were subjected to a manual bending test in comparison to pure PET and PA-test pieces. The test pieces were held at the ends and bent such that the two test piece ends were brought into contact with each other under the bending force, without thereby breaking. This test was determined to ISO 178 for the bending strength.

In pure PET and PA, this is possible without a relatively large effort. The test piece from Example 1 shatters in a splintering manner into numerous fragments even under only slight bending force (NB: protective goggles should be worn to avoid the risk of injury). Surprisingly, the test piece from Example 2 can be bent just as extensively as the two test pieces made of pure PA or PET.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A compatible blend composition comprising 99.99 to 90% by weight, relative to the entire blend, of at least two different incompatible thermoplastic molding compositions, 0.01 to 10% by weight, relative to the entire blend of carbodiimides and/or polycarbodiimides of the formula (I)

$$R'—(—N{=}C{=}N—R—)_n—R'' \quad (I),$$

where

R represents an aromatic radical wherein at least one ortho-position with respect to the aromatic carbon atom having the carbodiimide group, carries aliphatic and/or cycloaliphatic substituents with at least 2 C-atoms, R' represents aryl, aralkyl or R—NCO, R—NHCONHR$^1$, R—NHCONR$^1$R$^2$ or R—NHCOOR$^3$, R" represents —N=C=N-aryl, —N=C=N-aralkyl, —NCO, —NHCONHR$^1$, —NHCONR$^1$R$^2$ or —NHCOOR$^3$, R$^1$ and R$^2$ are the same or different and represent an alkyl, cycloalkyl or aralkyl radical, and R$^3$ has one of the meanings of R$^1$ or represents a polyester or a polyamide radical, and n represents an integer from 2 to 5,000; and wherein at least one of the thermoplastic molding compositions comprises at least one functional group selected from the group consisting of carboxylic acid, hydroxyl group, amino group, and mercaptan group, and at least one of the thermoplastic molding compositions is a polyamide, and at least one of the thermoplastic molding compositions is a thermoplastics polyester, said polyester consisting of one or more polyalkylene terephthalates wherein said thermoplastics polyester is neither derived from the reaction of one or more dihydric phenols with one or more aromatic dicarboxylic acids nor from 1,4-cyclohexanedimethanol.

2. A molded article comprising the composition according to claim 1.

3. The molded articles according to claim 2, wherein the article is a film(s) or fiber(s).

4. The molded articles according to claim 2, wherein the article is a machine housing or motor vehicle part.

5. A method for producing a compatible blend composition comprising 99.99 to 90% by weight, relative to the entire blend, of at least two different incompatible thermoplastic molding compositions, comprising:

mixing 0.01 to 10% by weight, relative to the entire blend, of a carbodiimide(s) and/or polycarbodiimide(s) of the formula (I)

$$R'—(—N{=}C{=}N—R—)_n—R' \quad (I),$$

where

R represents an aromatic radical wherein at least one ortho-position with respect to the aromatic carbon atom having the carbodiimides group, carries aliphatic and/or cycloaliphatic substituents with at least 2 C-atoms, R' represents aryl, aralkyl or R—NCO, R—NHCONHR$^1$, R—NHCONR$^1$R$^2$ or R—NHCOOR3, R" represents —N=C=N-aryl, —N=C=N-aralkyl, —NCO, —NHCONHR$^1$, —NHCONR$^1$R$^2$ or —NHCOOR$^3$, R$^1$ and R$^2$ are the same or different and represent an alkyl, cycloalkyl or aralkyl radical, and R$^3$ has one of the meanings of R$^1$ or represents a polyester or a polyamide radical, and n represents an integer from 2 to 5,000, with at least two Thermoplastic molding compositions containing at least one functional group selected from the group consisting of carboxylic acid, hydroxyl group, amino group, and mercaptan group in a mixing unit above the melt temperature of at least one of the components, wherein at least one of the thermoplastic molding compositions is a polyamide and wherein at least one of the thermoplastic molding compositions is a thermoplastic polyester, said polyester consisting of one or more polyalkylene terephthalates or mixtures thereof, wherein the thermoplastic polyester Is neither derived from the reaction of one or more dihydric phenols with one or more aromatic dicarboxylic acid nor from 1,4-cyclohexanedimethanol.

6. The method according to claim 5, wherein the mixing unit is selected from the group of units consisting of kneaders, single-screw extruders, twin-screw extruders, cascade extruders, devolatilizing extruders, multi-screw extruders and planetary-gear extruders.

7. The method according to claim 6, wherein the mixing unit is a closely intermeshing twin-screw extruder.

8. The method according to claim 6, wherein the mixing unit is a single-screw extruder, which operates according to the stator/rotor principle.

9. The method according to claim 6, wherein the mixing unit is a triple-screw extruder.

10. The method according to claim 6, wherein the mixing unit is a multi-screw extruder which operates according to the planetary extruder principle.

11. The method according to claim 6, wherein the mixing unit is a continuously or discontinuously operating co-kneader.

12. The method according to claim 6, wherein the mixing unit is a continuously operating dispersion kneader with slow-speed rotor-stator combination.

* * * * *